Nov. 13, 1962 H. M. GRUBB ETAL 3,064,193

DIGITIZING AMPLIFIER

Filed Oct. 24, 1958

2 Sheets-Sheet 1

INVENTORS:
Henry M. Grubb
Charles H. Ehrhardt

BY Gerald Rose

ATTORNEY

Nov. 13, 1962 H. M. GRUBB ETAL 3,064,193

DIGITIZING AMPLIFIER

Filed Oct. 24, 1958 2 Sheets-Sheet 2

INVENTORS:
Henry M. Grubb
Charles H. Ehrhardt

BY Gerald Rose

ATTORNEY

United States Patent Office 3,064,193
Patented Nov. 13, 1962

3,064,193
DIGITIZING AMPLIFIER

Henry M. Grubb, Highland, Ind., and Charles H. Ehrhardt, Western Springs, Ill., assignors to Standard Oil Company, Chicago, Ill., a corporation of Indiana
Filed Oct. 24, 1958, Ser. No. 769,413
4 Claims. (Cl. 324—120)

Figure 1:
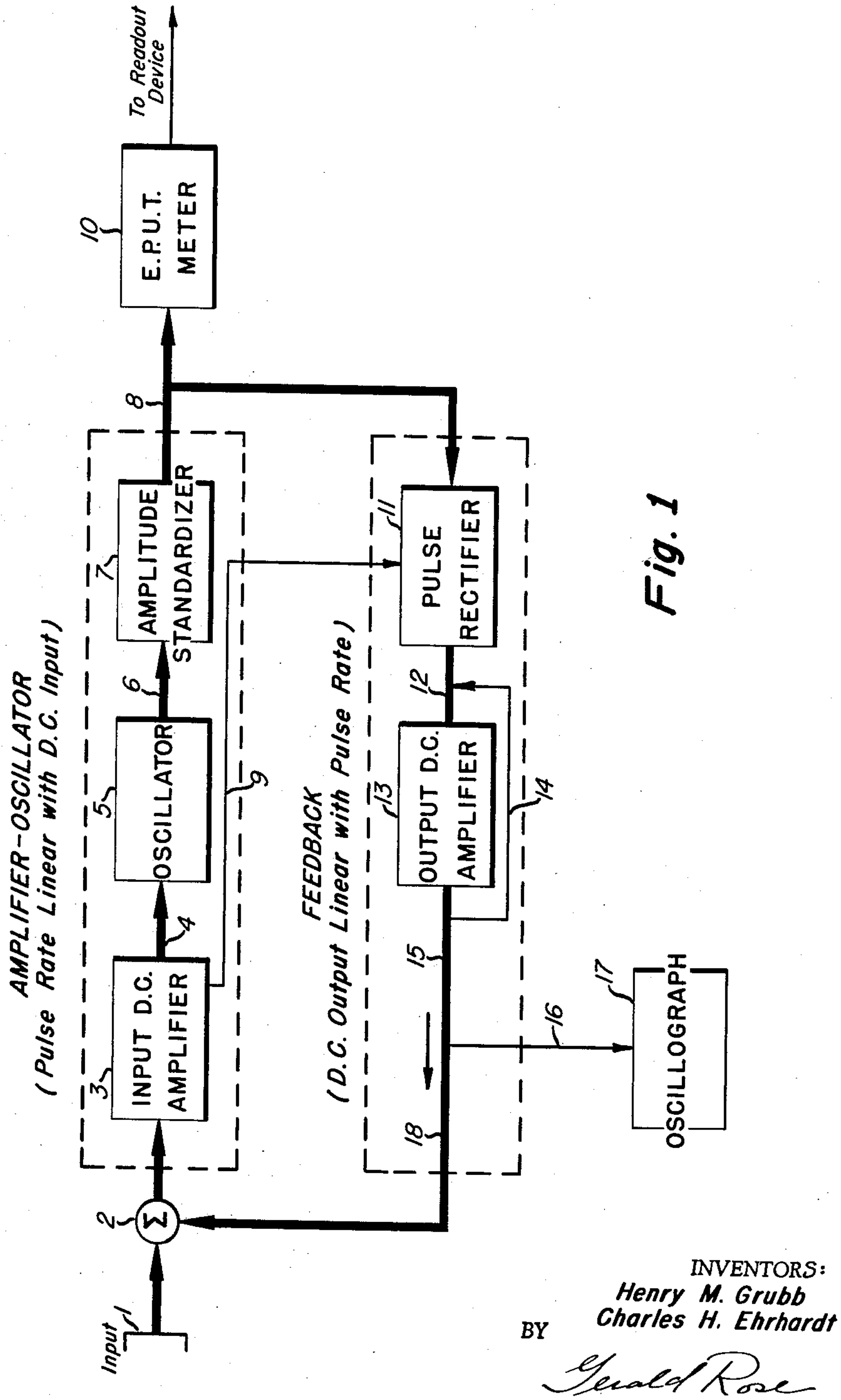

This invention relates to electronic means for converting the output from an analytical device to a digital output suitable for feeding to an indicator or computer. More particularly, the invention relates to an extremely sensitive, yet highly stable, automatic amplifier which provides an accurate, nearly instantaneous digital readout of the peaks produced by analytical devices such as mass spectrometers.

In recent years, automatic equipment has been developed for rapidly analyzing various materials by means of their chemical or physical properties. Such equipment as the mass, ultraviolet, and infrared spectrometers have permitted compounds or mixtures to be qualitatively and quantitatively analyzed in extremely short times. These devices express their output in the form of a voltage or current, the magnitude of which is a function of the analytical result. While the analytical equipment itself has seen rapid development, improved methods for converting their outputs to a meaningful result has either not been forthcoming or has been obtainable only at inordinately high cost. Where, as in the case of the mass spectrometer, the current output may be on the order of $10^{-10}$ amperes or less, it is evident that any readout system which is to give satisfactory performance must not only be capable of extreme sensitivity, but must be stable in operation and not be adversely affected by transient noise from external or internal sources.

In the past, the concurrent requirements of sensitivity and stability have not been readily satisfied. Mechanical readout devices, which operate on the principle of a rotating shaft connected to a mechanical or electrical amplifier and translate shaft rotation into a number, have shown good stability by virtue of the inertia of the system, but this same inertia has mitigated against acceptable speed of response. Automatic electronic potentiometers, which attempt to read peak height during a quiescent period, of necessity rely on an estimate of peak height, and accuracy suffers when the estimate is in error; furthermore these are capable of digitizing only during a small fraction of the analytical period, and are therefore exceedingly slow in operation.

In accordance with the present invention, an automatic digitizer amplifier circuit is provided which not only possesses the necessary sensitivity, but has exceptional stability and provides extremely rapid, almost instantaneous, readout. In its broad aspect, the invention comprises an electronic amplifier for amplifying the output of an analytical device and an oscillator for converting this output to an oscillating current having a pulse rate which is linear with the input. Precise linearity, to an accuracy which is within a few tenths of one percent, is obtained by employing an inverse feedback circuit which includes a rectifier for converting the oscillator pulse rate to a direct current which is linear with the pulse rate. This inverse feedback is transmitted to the summing junction of the input amplifier and provides overall stabilization for the digitizing amplifier circuit. If desired, an oscillograph may be connected to the source of this feedback to obtain a permanent record of the analysis. To obtain a digital reading which is a measure of the analytical output initially fed to the input amplifier, an events per unit time EPUT meter is installed in the circuit whereby the oscillating current established by the oscillator is sampled over a finite base period, on the order of a second or so.

Thus, any transient noises which produce positive and negative excursions in the oscillator pulse rate, are averaged out over the base time period and become negligible. The EPUT meter which counts the oscillations feeds into a suitable indicator or recorder such as a teleprinter, electric typewriter, or tape or computer card punch, which furnishes the actual numerical readout of the analytical device. Since noise is eliminated by the averaging action of the EPUT meter, since the circuit is stable, and since electronic rather than mechanical components are utilized, the circuit is both extremely sensitive and rapid in its response.

The invention will be more fully understood, and various features thereof will be explained in more detail, by reference to the following description read in conjunction with the attached drawings wherein FIGURE 1 is a block diagram of the preferred form of digitizing amplifier according to the present invention.

Figure 2:
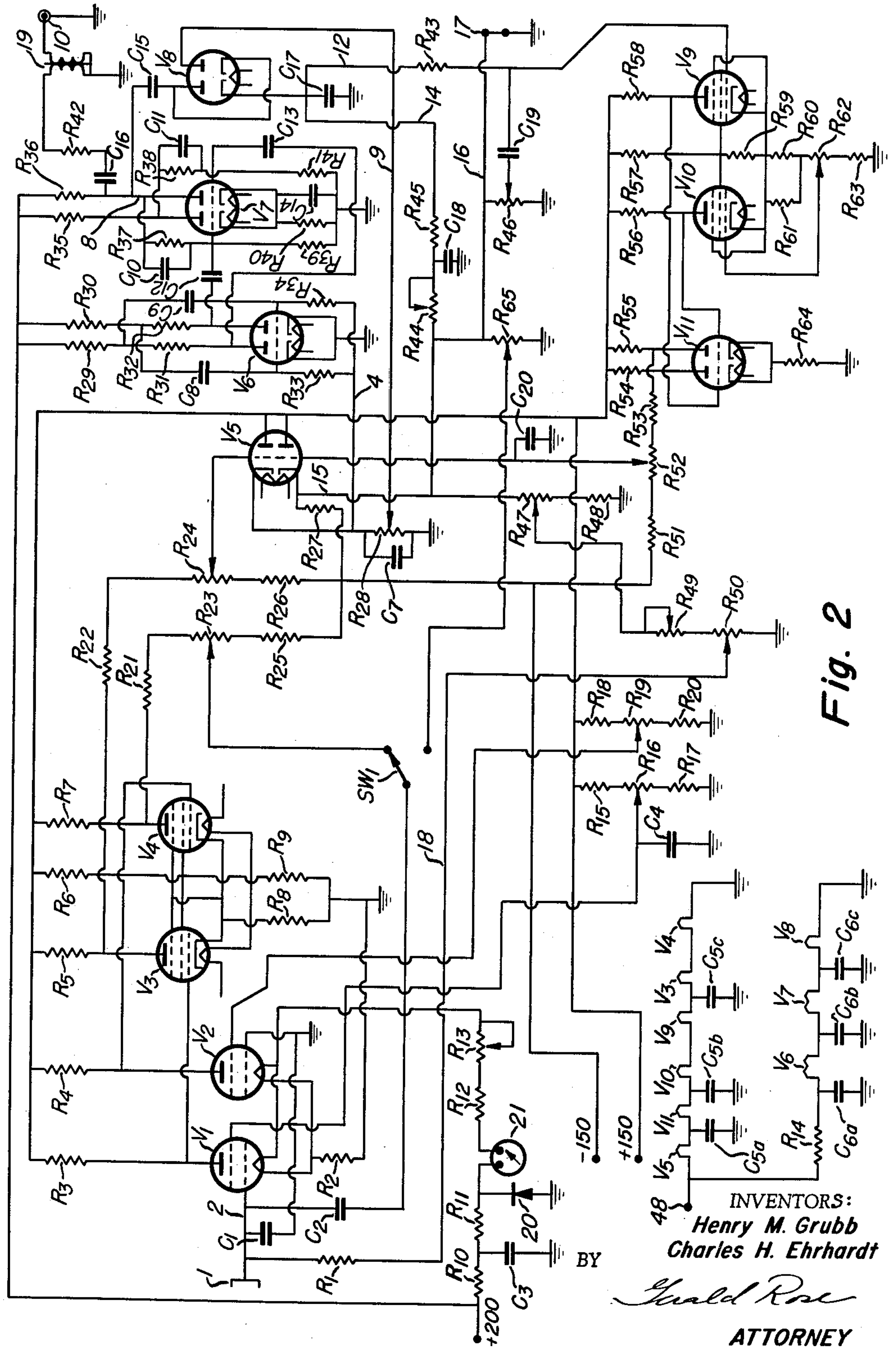

FIGURE 2 is a detailed schematic circuit diagram of the digitizing amplifier shown in FIGURE 1.

Referring now to FIGURE 1 wherein a block diagram of the preferred digitizing amplifier is shown, an input voltage or current 1 is initially obtained from an analytical device (not shown) at the left of the circuit. This device may be, for example, a mass spectrometer, in which event input 1 is the ion beam collector which receives the ions derived from electron bombardment of the sample undergoing analysis. This current at input 1 is ordinarily extremely small, rarely greater than $10^{-10}$ amperes and usually much less, and is thereupon transmitted via summing juunction 2 to the amplifier-oscillator portion of the automatic digitizer.

Input amplifier 3 is a high gain D.C. amplifier capable of amplifying the low input 1 to obtain a voltage and current of sufficient magnitude for feeding to oscillator 5. Amplifier 3 output is conducted via line 4, to oscillator 5 which is of the electron tube type and produces a pulse rate which, with the addition of the overall feedback circuit, is almost exactly linear with the D.C. input. When, as in accordance with the preferred embodiment, input D.C. amplifier 3 delivers a finite output at zero input 1, the output of oscillator 5 will have a substantial frequency at zero input 1, and will increase as input 1 increases. The output of oscilator 5 is conducted via line 6 to amplitude standardizer 7 which produces a squarewave output having exactly the same frequency as originally derived from oscillator 5 (or, alternately, a multiple or fraction thereof) but of an amplitude which remains constant irrespective of frequency. This constant amplitude output is tapped off at line 8 and forms two branches, one of which may be connected to an events per unit time meter 10 while the other is transmitted to the feedback circuit.

The feedback circuit, which insures that the amplifier-oscillator portion of the circuit delivers an absolutely linear frequency in response to input 1, and which also provides an amplified D.C. output to drive oscillograph 17, relies on electronic pulse rectifier 11 to produce an output which is linear with the frequency established by oscillator 5. This rectified output is conducted through line 12 to output D.C. amplifier 13, which amplifies the direct current and transmits it through line 15 and 18 as a stabilizing negative or inverse feedback to summing junction 2 for the amplifier-oscillator portion of the circuit. Pulse rectifier 11 employs line 9 to provide linearity in its own operation, and a local feedback 14 around output D.C. amplifier 13 insures independent linearity of this component.

Turning now to FIGURE 2 showing the schematic circuit diagram of the preferred embodiment of the instant invention, it will be observed that numerical designations appearing in FIGURE 2 correspond exactly with those in FIGURE 1. Ion collector 1 feeds directly to the control grid of tube V1 through summing junction 2, which is shown in this figure as a line or bus bar. Tube V1 constitutes the first stage of a three-stage direct coupled high gain D.C. amplifier comprising pentode V1, pentode V3, and, as cathode follower, the upper portion of triode V5. To minimize baseline drift, the amplifier operates push-pull, using V2 and V4 as drones for tubes V1 and V3. Tubes V1 and V2 have directly heated cathodes, the filament current being controlled by Zener diode 20 and potentiometer R13. The output of this amplifier system, which generally is on the order of five or ten volts, may be regulated by appropriate selection or adjustment of high impedance resistor R1 and potentiometer R50. Where input 1 may vary over wide ranges of current or voltage, as will occur in the case where mass spectrometer peak heights are of widely differing heights, several stages of gain control may be provided by employing stepped resistors in lieu of potentiometer R50. Step selection may be performed manually or automatically in response to a voltmeter connected to the output of amplifier 3.

The cathode output of input D.C. amplifier 3 is transmitted through line 4 to oscillator 5. Oscillator 5 may be a relaxation oscillator of the free-running positive grid bias multivibrator type (tube V6) which delivers a pulse output in the audio frequency range, has an initial frequency output of, for example, 10,000 c.p.s. at zero input 1, and has an output of say 20,000 c.p.s. at maximum input 1. By means of the overall feedback circuit, oscillator 5 is made to deliver an output frequency which is exactly linear with the voltage developed by the current at input 1.

With the selection of a multivibrator type oscillator, the oscillator output has a substantially squarewave form. This output may be fed to separate amplitude standardizer comprising tube V7, which is triggered by the pulses of tube V6 and produces an output at line 8 which has precisely the same frequency as the output of tube V6, but has an amplitude which is maintained constant independent of the frequency. If desired to match a particular events per unit time meter, one or more frequency doublers or dividers may be installed between tube V6 and tube V7 to either multiply or divide the frequency established by oscillator tube V6.

In order to count the number of oscillations occurring during a base time period, an events per unit time meter (shown as block 10 in FIGURE 1) is capacitively coupled to line 8, the output of amplitude standardizer tube V7. This coupling also includes pulse transformer 19 to match the impedance of the EPUT meter circuitry. Events per unit time meters are well known to the art and are described in the catalogs of numerous instrument manufacturers. These meters operate on the principle of establishing an arbitrary time period of, for example, one or two seconds, and counting the number of pulses or oscillations received during the time period. Since oscillator 5 (FIGURE 1) produces a certain frequency output at zero input 1, the events per unit time meter is provided with means for deducting the zero input frequency from the frequency actually measured during the base time period. A subtracting circuit is described by Regener at volume 17, Number 10, page 375, of The Review of Scientific Instruments. Alternatively, such subtraction may be provided for in either the readout of EPUT meter 10 or in a computer utilizing the readout.

Noises, which may be transient positive and negative excursions of the input at ion collector 1, as well as Johnson noise from input resistor R1, are minimized in two ways. For one, a low-pass filter at the input of D.C. amplifier 3 (tube V1 grid) is established by resistor R1 and condensers C1 and C2 together with distributed capacity in the grid circuit of tube V1. Other resistors in the circuit affect the band pass width, and it has been found convenient to employ switch SW1 to route A.C.

feedback either through resistors R27—R25—R23 or through R65. In the upper position, a wide pass band is used and this has been found advantageous when the recording oscillograph is not in use. When oscillograph 17 is employed it is then preferable to have switch SW1 in the lower position.

As a second and most important means of eliminating noise, the selection of the base time period for EPUT meter 10 is made such that the time is sufficiently long that any noise which does escape the amplifier band-pass filter or which is created throughout the system is averaged out during a relatively long measuring period. Therefore, whatever noise is present as frequency modulation at line 8 (the output of amplitude standardizer tube V7), it is not apparent in the reading of events per unit time meter 10 since the frequency deviations tend to average out.

The pulsating A.C. current at line 8 is withdrawn and transmitted to a pulse rectifier tube V8 which delivers an output current that is linear with the frequency of the input thereto. The preferred pulse rectifier is of the diode, preferably a duo-diode, type and operates in well known manner; a description of its operation may be found in such publications as Reich et al., The Review of Scientific Instruments, 19, page 43, 1948, and especially in FIG. 5 therein. Precise linearity of tube V8 output over widely varying input frequencies is assured by a variable bias applied from the upper half of cathode follower V5 (in input D.C. amplifier 3) through potentiometer R28 and line 9 to one plate of tube V8.

The rectified D.C. output of rectifier tube V8 is transmitted through line 12 to a direct coupled three-stage push-pull output D.C. amplifier (block 13 in FIGURE 1) comprising tubes V9, V10, V11 and the lower half of tube V5. A stabilizing local feedback for the amplifier is applied through resistors R44 and R45 and line 14. The final stage output of the amplifier appears as the cathode output in the bottom half of tube V5 and is taken through line 15. One portion of the output may be transmitted via line 16 and terminal 17 to a conventional recording oscillograph (block 17 in FIGURE 1) which may utilize multiple galvanometers and a photosensitive sheet to obtain a visible permanent record of the analysis being made by the mass spectrometer. Since the feed to oscillograph 17 is obtained from the same circuit as is employed to energize the EPUT meter, except, of course, after rectification and amplification, the oscillograph will reveal exactly the same peaks as are being recorded by the EPUT meter.

Another portion of output D.C. amplifier output is tapped at potentiometer R50 and fed back as an overall negative feedback through line 18 via R1 to summing junction 2 of the input D.C. amplifier. This effects overall stabilization of the circuit, and provides an accuracy hitherto unobtainable in electronic readout circuits. The amount of necessary feedback is determined experimentally and may be adjusted by appropriate regulation of potentiometer R50.

The operation of the present inventive circuit is exceedingly simple. Where input 1 is the ion collector of a mass spectrometer, a sample is placed in the mass spectrometer and is analyzed in the usual manner. In the case of a sample of unknown qualitative composition, whenever a mass number peak appears on oscillograph 17 (or on an oscillograph separately connected to the mass spectrometer), the digitizer immediately reports its height. In the case of a sample containing known or expected components but in unknown amount, the spectrometer is automatically or manually set to select only those mass numbers of interest thereby eliminating the need for oscillographs, and only those peaks are digitized.

While the foregoing description has been particularly directed to the use of a mass spectrometer as the source of input voltage 1, it is apparent that the invention may be used in conjunction with numerous other devices.

Ultraviolet and IR spectrometers are common examples. Thermocouples, strain gauges, transducers pressure gauges, and the like are typical of devices which, while not strictly analytical, deliver or can be made to deliver electrical outputs which, although they may require pre-amplification, may be digitized and read out by means of the present circuit. It is also within the scope and spirit of the invention to adapt the circuit to integrate the area under a curve rather than to read the peak height, in conformity with the preferred practice when employing infrared or ultraviolet spectrometers. This may be accomplished, for example, by connecting a slave slide wire to a recorder and using the slide wire output as input 1, thereby making oscillator 5 frequency linear with the percent transmission or energy absorbance. By counting the oscillating pulses during the entire curve with the EPUT meter set for a time sufficient to cover the whole curve, the desired integral is obtained.

Specific values of resistance, capacitance, vacuum tubes, etc., which were actually and satisfactorily employed in a specific embodiment of the invention, are set forth below:

Resistors R

| | | | |
|---|---|---|---|
| 1 | 50K meg. | 34 | .56 m. |
| 2 | 100. | 35 | 33K. |
| 3 | 20 m. | 36 | 33K. |
| 4 | 20 m. | 37 | 470K. |
| 5 | 600K. | 38 | 470K. |
| 6 | 150K. | 39 | 330K. |
| 7 | 600K. | 40 | 22K. |
| 8 | 50K. | 41 | 330K. |
| 9 | 100K. | 42 | 82K. |
| 10 | 3,500. | 43 | 10 m. |
| 11 | 3,500. | 44 | 100K. |
| 12 | 200. | 45 | 100K. |
| 13 | 100. | 46 | 20K. |
| 14 | 80. | 47 | 2K. |
| 15 | 300K. | 48 | 4K. |
| 16 | 10K. | 49 | 10K. |
| 17 | 13.5K. | 50 | 30K. |
| 18 | 300K. | 51 | 10 m. |
| 19 | 10K. | 52 | 2.5 m. |
| 20 | 13.5K. | 53 | 5 m. |
| 21 | 5 m. | 54 | 150K. |
| 22 | 5 m. | 55 | 150K. |
| 23 | 2.5 m. | 56 | 10 m. |
| 24 | 2.5 m. | 57 | 250K. |
| 25 | 10 m. | 58 | 10 m. |
| 26 | 10 m. | 59 | 30K. |
| 27 | 25K. | 60 | 5K. |
| 28 | 2K. | 61 | 25K. |
| 29 | 3.3K. | 62 | 2K. |
| 30 | 3.3K. | 63 | 13K. |
| 31 | 47K. | 64 | 20K. |
| 32 | 47K. | 65 | 20K. |
| 33 | .56 m. | | |

Condensers C

| | | | |
|---|---|---|---|
| 1 | 68 mmf. | 9 | 250 mmf. |
| 2 | 15 mmf. | 10 | 47 mmf. |
| 3 | 40 mf. | 11 | 47 mmf. |
| 4 | .25 mf. | 12 | 10 mmf. |
| 5a | 60 mf. | 13 | 10 mmf. |
| 5b | 80 mf. | 14 | .01 mf. |
| 5c | 100 mf. | 15 | 56 mmf. |
| 6a | 60 mf. | 16 | .02 mf. |
| 6b | 80 mf. | 17 | .05 mf. |
| 6c | 100 mf. | 18 | .01 mf. |
| 7 | 1 mf. | 19 | 1 mf. |
| 8 | 250 mmf. | 20 | .25 mf. |

Tubes V

| | | | |
|---|---|---|---|
| 1 | CK5886. | 7 | 5963. |
| 2 | CK5886. | 8 | 12AL5. |
| 3 | 6BH6. | 9 | 5879. |
| 4 | 6BH6. | 10 | 5879. |
| 5 | 12AU7. | 11 | 12AU7. |
| 6 | 12AX7. | | |

From the foregoing presentation it is apparent that an automatic circuit according to the present invention is not only capable of unprecedented sensitivity and response speed, but is also extremely stable and rugged in its operation. The problems of slow speed and either an overly sensitive or overly stable digitizer which heretofore plagued the art may now be overcome completely. Moreover, the present circuit is extremely simple to construct and operate and is characterized by exceptionally long component life and unusual freedom from baseline drift.

Having described the invention what is claimed is:

1. An electronic digitizing and readout circuit for developing pulses at a rate linear with a D.C. input and for reading out said pulses per unit time as a measure of said D.C. input, which circuit comprises: a high gain input D.C. amplifier, multivibrator oscillator means for generating pulses at a rate substantially and directly linear with the output of said amplifier, amplitude standardizer means for converting the output pulses of said oscillator to pulses of constant amplitude independent of frequency, said constant amplitude pulses having a pulse rate linear with the D.C. input, an overall inverse feedback circuit to said input D.C. amplifier, said inverse feedback circuit including a pulse rectifier and an output D.C. amplifier for producing a D.C. output linear with the aforesaid pulse rate, and means for counting the number of pulses generated per unit time as a digital measure of said D.C. input.

2. Circuit of claim 1 including variable high impedance means for regulating the gain of said input D.C. amplifier.

3. Circuit of claim 1 including a recording oscillograph connected to said inverse feedback circuit.

4. Circuit of claim 1 wherein said high gain D.C. amplifier is a multi-stage push-pull amplifier.

References Cited in the file of this patent

UNITED STATES PATENTS

| | | |
|---|---|---|
| 2,297,543 | Eberhardt | Sept. 29, 1942 |
| 2,358,480 | Skilling | Sept. 19, 1944 |
| 2,569,791 | Wild | Oct. 2, 1951 |
| 2,590,460 | Rackey | Mar. 25, 1952 |
| 2,710,397 | Foster | June 7, 1955 |
| 2,840,806 | Bateman | June 24, 1958 |
| 2,848,610 | Freienmuth | Aug. 19, 1958 |
| 2,856,468 | Berry | Oct. 14, 1958 |
| 2,872,670 | Dickinson | Feb. 3, 1959 |